US010928826B2

(12) United States Patent
Abari et al.

(10) Patent No.: US 10,928,826 B2
(45) Date of Patent: Feb. 23, 2021

(54) SENSOR FUSION BY OPERATIONS-CONTROL VEHICLE FOR COMMANDING AND CONTROLLING AUTONOMOUS VEHICLES

(71) Applicant: Lyft, Inc., San Francisco, CA (US)

(72) Inventors: Farzad Cyrus Foroughi Abari, San Bruno, CA (US); Romain Clément, Campbell, CA (US); Roxie Lynn Paine, Mountain View, CA (US)

(73) Assignee: Lyft, Inc., San Francisco, CA (US)

( * ) Notice: Subject to any disclaimer, the term of this patent is extended or adjusted under 35 U.S.C. 154(b) by 168 days.

(21) Appl. No.: 16/172,648

(22) Filed: Oct. 26, 2018

(65) Prior Publication Data

US 2020/0133288 A1    Apr. 30, 2020

(51) Int. Cl.
| | | |
|---|---|---|
| *G05D 1/02* | (2020.01) | |
| *G05D 1/00* | (2006.01) | |
| *G01S 13/931* | (2020.01) | |
| *G01S 13/86* | (2006.01) | |

(52) U.S. Cl.
CPC ......... *G05D 1/0231* (2013.01); *G05D 1/0088* (2013.01); *G05D 1/0291* (2013.01); *G01S 13/865* (2013.01); *G01S 13/867* (2013.01); *G01S 13/931* (2013.01)

(58) Field of Classification Search
CPC .... G01S 13/865; G01S 13/867; G01S 13/931; G05D 1/0088; G05D 1/0231; G05D 1/0291
USPC .......................................................... 701/23
See application file for complete search history.

(56) References Cited

U.S. PATENT DOCUMENTS

| | | | |
|---|---|---|---|
| 10,582,137 B1* | 3/2020 | Benemann ................ G01S 7/51 |
| 2005/0192727 A1* | 9/2005 | Shostak ................ B60C 23/041 701/37 |
| 2006/0025897 A1* | 2/2006 | Shostak ................. G08G 1/017 701/1 |
| 2010/0214085 A1 | 8/2010 | Avery | |
| 2012/0169053 A1* | 7/2012 | Tchoryk, Jr. .............. G01P 5/26 290/44 |

(Continued)

FOREIGN PATENT DOCUMENTS

KR    20160112544 A    9/2016

OTHER PUBLICATIONS

International Search Report and Written Opinion for International Application No. PCT/ US2019/057731, dated Feb. 14, 2020.

*Primary Examiner* — Atul Trivedi
(74) *Attorney, Agent, or Firm* — Baker Botts L.L.P.

(57) ABSTRACT

In one embodiment, a method includes receiving sensor data from one or more sensors of each of one or more vehicles, processing a combination of the sensor data to generate an assessment of an area surrounding the one or more vehicles based on one or more points-of-view of the area, the one or more points-of-view of the area generated based on synchronizing the combination of the sensor data, and detecting an occurrence of an event based on the assessment of the area. The method further includes identifying one or more instructions corresponding to the event, the instructions associated with a particular vehicle and sending one or more executable instructions based on the instructions to the particular vehicle.

20 Claims, 9 Drawing Sheets

(56) References Cited

U.S. PATENT DOCUMENTS

| | | | |
|---|---|---|---|
| 2012/0206050 A1* | 8/2012 | Spero | H05B 3/008 |
| | | | 315/152 |
| 2013/0063282 A1 | 3/2013 | Baldwin | |
| 2013/0289862 A1 | 10/2013 | Chapman | |
| 2016/0091327 A1 | 3/2016 | Shen | |
| 2017/0008521 A1* | 1/2017 | Braunstein | G05D 1/0287 |
| 2017/0123422 A1* | 5/2017 | Kentley | B60L 15/20 |
| 2017/0123428 A1* | 5/2017 | Levinson | G01S 13/86 |
| 2017/0124781 A1* | 5/2017 | Douillard | G08G 1/202 |
| 2017/0126810 A1* | 5/2017 | Kentley | G06Q 50/30 |
| 2017/0351261 A1* | 12/2017 | Levinson | G01S 13/86 |
| 2018/0004211 A1* | 1/2018 | Grimm | G05D 1/0214 |
| 2018/0139431 A1* | 5/2018 | Simek | H04N 13/254 |
| 2018/0307925 A1* | 10/2018 | Wisniowski | G06K 9/6271 |
| 2018/0332236 A1* | 11/2018 | Glaser | H04N 5/2259 |
| 2019/0250601 A1* | 8/2019 | Donahoe | G05D 1/101 |
| 2020/0026282 A1* | 1/2020 | Choe | G05D 1/0278 |
| 2020/0104433 A1* | 4/2020 | Santarone | G06F 30/13 |
| 2020/0133288 A1* | 4/2020 | Abari | G01S 7/003 |
| 2020/0191943 A1* | 6/2020 | Wu | G01S 13/003 |

* cited by examiner

SENSOR FUSION BY OPERATIONS-CONTROL VEHICLE FOR COMMANDING AND CONTROLLING AUTONOMOUS VEHICLES

BACKGROUND

Light Detection and Ranging (LIDAR) is a sensing method that uses a light beam to measure the distance from a vehicle to various objects. A LIDAR sensor works by emitting a light beam and measuring the time it takes to return. The return time for each return light beam is combined with the location of the LiDAR sensor to determine a precise location of a surface point of an object, and this location is recorded as a three-dimensional point in space. An optical camera captures and records images of the external environment. A camera works by opening an aperture to take in light through a lens, and then a light detector (e.g., a charge-coupled device (CCD) or CMOS image sensor) turns the captured light into electrical signals including color and brightness of each pixel of the image.

A radar antenna may detect and estimate the shape of objects near the vehicle. A radar antenna signal typically consists of a main lobe that projects out of the antenna and into the space in front of the antenna. The radar antennas may be phased array antennas. The vehicle may be able to steer the beam generated by the phased array antenna using a phase shifter to generate constructive interference in many different directions. As the vehicle moves through the environment, the vehicle may gather information through the radar antenna and other sensors, such as imaging data, information about riders, and information about its own vitals.

Autonomous vehicles may use a LiDAR sensor to obtain depth profiles of the environment, an optical camera to obtain image profiles of the environment in order to help navigate the vehicle around the environment, radar antenna to detect and estimate the shape of objects near the vehicle, and various other sensors on the vehicle to collect information about the vehicle and its surroundings. However, this information is usually processed at the vehicle level or transmitted to a server in large batches for processing. This may result in overburdening the processing power of the vehicle itself or may be inefficient and untimely for reviewing and assessing information necessary for the vehicle to make urgent or necessary decisions (e.g., relating to routing instructions, sensor/vehicle health and status, etc.).

DESCRIPTION OF EXAMPLE EMBODIMENTS

Figure 1A:
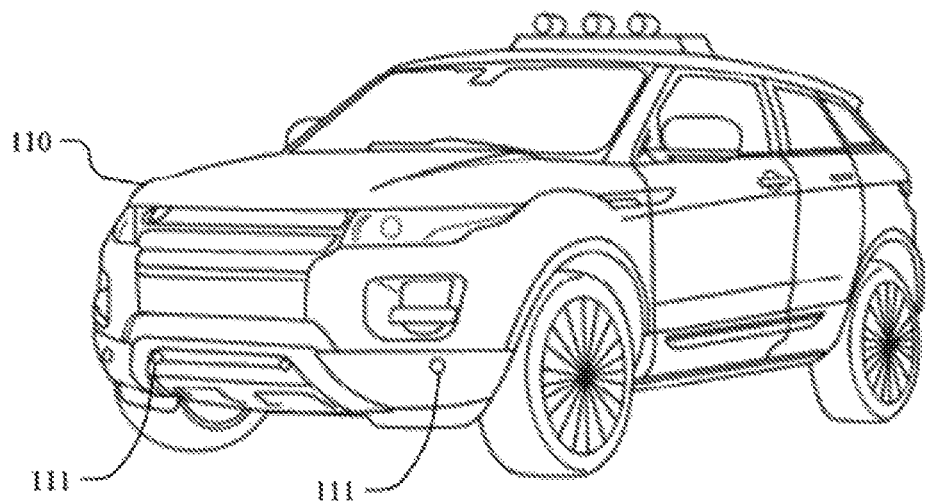
FIGS. 1A and 1B illustrate an example vehicle with example sensors.

Transportation management technology for "smart" vehicles may be used for intelligent transportation and user interaction to help optimize vehicle safety, efficiency, and user-friendliness. A vehicle may use various devices and sensors (e.g., LiDAR, cameras, radar, etc.) to sense its environment and navigate around this environment with little to no human input. In a regular manually-driven vehicle, these devices and sensor may assist the vehicle operator to more safely or efficiently operate the vehicle, for example, by using object warning detection indicators, optimizing speed for fuel economy, detecting lane markers and changes, avoiding or minimizing collisions, and/or deploying other relevant vehicle monitoring or maneuvers. In addition, these devices may help take most or full control of vehicle operation from the vehicle operator under some or all circumstances when the transportation management technology is able to recognize a dangerous or risky situation and steer or control the vehicle to avoid or mitigate the situation.

In the case of autonomous vehicles, a vehicle may be equipped with a variety of systems or modules for enabling it to determine its surroundings and safely and automatically navigate to target destinations. For example, an autonomous vehicle may have an integrated computing system (e.g., one or more central processing units, graphical processing units, memory, and storage) for controlling various operations of the vehicle, such as driving and navigating. To that end, the computing system may process data from one or more sensor arrays. For example, an autonomous vehicle may have optical cameras for, e.g., recognizing roads and lane markings, and objects on the road; LiDARs for, e.g., detecting 360° surroundings; radio detection and ranging (RADAR) for, e.g., detecting distant hazards by detecting the presence and locations of objects in the environment, in addition to communicating with external networks; infrared cameras for, e.g., night vision; stereo vision for, e.g., spotting hazards such as pedestrians or tree branches; wheel sensors for, e.g., measuring velocity; ultrasound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by a navigation system to safely guide the autonomous vehicle, even without the aid of a human driver. The autonomous vehicle may also include communication devices for, e.g., wirelessly communicating with one or more servers, user devices (e.g., smartphones, tablet computers, smart wearable devices, laptop computers) and/or other vehicles.

Successful and safe navigation of a vehicle depends on having accurate data measurement and representation of the external environment at all times. In particular embodiments, to maintain an accurate representation or three-dimensional model of the external environment, an optical camera may capture a picture of the external environment, a LiDAR instrument may use a light beam to measure the distance to various objects in the external environment, and radar antennas may detect distant hazards by detecting the presence and locations of objects in the environment. An optical camera works by taking a color image profile of the environment, and the data collected can be processed to read signs, navigate along road markings, recognize moving or stationary objects relevant to the movement of the vehicle, and other important visual driving cues. Multiple optical cameras (e.g., between four to six cameras) may be used to create a three-dimensional image by image stitching the data from each of the optical cameras. A LiDAR instrument works by emitting a light beam out into the world and measuring the time it takes to return to obtain a depth profile of the environment. The return time for each return light beam is combined with the location of the LiDAR instrument to determine a precise location of a surface point of an object. This location is recorded as a three-dimensional point in space, i.e., azimuth, elevation, and range. In some LiDARs, the Doppler information from the target is acquired, providing a 4D data point. Several recorded three-dimensional points may provide an accurate three-dimensional representation of the environment surrounding the LiDAR instrument, which may be referred to as a point cloud. A LiDAR system typically includes a light source, a receiver, a mirror that rotates or tilts on a gimbal, timing electronics, a Global Positioning System (GPS), and an Inertial Measurement Unit (IMU). A radar antenna typically includes a radar antenna array that includes multiple antennas that work by steering a radar signal in multiple different directions. The radar antenna may be configured to detect the presence and location of objects within the environment by emitting a radar signal that is reflected off the object or objects back to a receiver associated with the radar antenna. The radar antenna may also be configured to transmit data to an external server by modulating the phase, amplitude, or frequency of the emitted signal.

Typically, vehicles collect information from the variety of sensors discussed above and process the information at the vehicle level to determine whether the collected information may result in updates or revisions to routing and/or handling of the vehicle. In addition, the vehicles may collect the information from the variety of sensors and send the information to an external server for processing. As an example, if a vehicle determines that there is an obstacle on the road ahead of the vehicle based on sensor information, the vehicle may use the information to route the vehicle along a different lane of the road or a different route, and may also send the information to an external server (e.g., a transportation management server) so that other vehicles in the area can be informed of the presence of the obstacle on the road. However, in a situation where the sensors of the vehicle may be collecting a plethora of information of the surrounding environment, in addition to information collected about the vehicle itself (e.g., diagnostic information, sensor status, etc.), the vehicle itself may not have enough processing power to assess all the collected information and make time-sensitive updates and revisions to routing and/or handling of the vehicle. In addition, since the vehicle may only be able to collect information on its immediate surroundings and the vehicle itself, the vehicle may also be receiving information from external servers, including routing details, environment details, weather details, vehicle status details, any other relevant details and information, and any combination thereof. This additional information downloaded to the vehicle may further burden the processing power of the vehicle to assess the information in determining whether to update or revise routing and/or handling of the vehicle. Moreover, due to inherent latency issues with receiving information from external servers, some of the information that may be relevant to the routing and/or handling of the vehicle may not be downloaded or processed in a timely manner, and thus the vehicle may not be able to make changes to the routing and/or handling of the vehicle despite receiving information to do so.

In particular embodiments, a large amount of sensor information may be sent from a number of different vehicles to an operations-control vehicle (e.g., a type of centralized "brain" vehicle) that has more processing power and better sensors than a typical vehicle. This operations-control vehicle may then process and synthesize all the information received in a process including sensor fusion of all sensor information received, and then redistribute the processed information and/or generated instructions relevant to the routing and/or handling of the vehicles to the different vehicles. As an example, the operations-control vehicle may be equipped with faster processors, more memory, more power, better LiDAR (e.g., more dynamic range, more granular data, higher resolution data, better performance under low-light situations, less moving parts, etc.), better cameras (e.g., higher resolution color photos, more dynamic range, etc.), better radar (e.g., more detailed distance data, more detailed velocity data, etc.) and other state-of-the-art hardware. This hardware may allow the operations-control vehicle to act as a "swarm brain" for all vehicles in a fleet, from collecting and processing information to making decisions on what information to send to which vehicles of the fleet. Alternatively, the operations-control vehicle may simply collect and more efficiently and effectively preprocess the sensor information from the vehicles in the fleet using its more advanced hardware and software components, and then provide the sensor information to all vehicles that may find the information to be relevant to routing and/or handling of the vehicle.

The advantages of the method of sensor fusion across a fleet of vehicles that allows for the communication and processing of information collected by individual vehicles to be distributed throughout the fleet of vehicles using centralized operations-control vehicles or on a vehicle-to-vehicle basis include more efficient processing and distribution of sensor information to each of the vehicles in a fleet, which may lead to better routing and/or handling of each of the vehicles. This disclosure contemplates a first embodiment that is directed to the use of centralized operations-control vehicles that are equipped with faster processors, more memory, more power, better lidar, better radar, and other hardware. A second embodiment is directed to the use of a stationary roadside base station installed throughout the infrastructure of the environment in place of, or alternatively, together with the operations-control vehicles. The roadside base station may have many of the hardware and software advantages that the operations-control vehicle has, and can receive, process, and sent out information similarly to the operations-control vehicles. As an example, the base stations may be installed on buildings, traffic signals, in the roadway, on utility boxes, stop signs, or in any other suitable location. A third embodiment is directed to the use of a movable drone that also has many of the hardware and software advantages that the operations-control vehicle has, and can receive, process, and sent out information similarly to the operations-control vehicles. As an example, the drones may be instructed to move within a geographic area to process information and communicate with individual vehicles that move into and out of the geographic area.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1B:
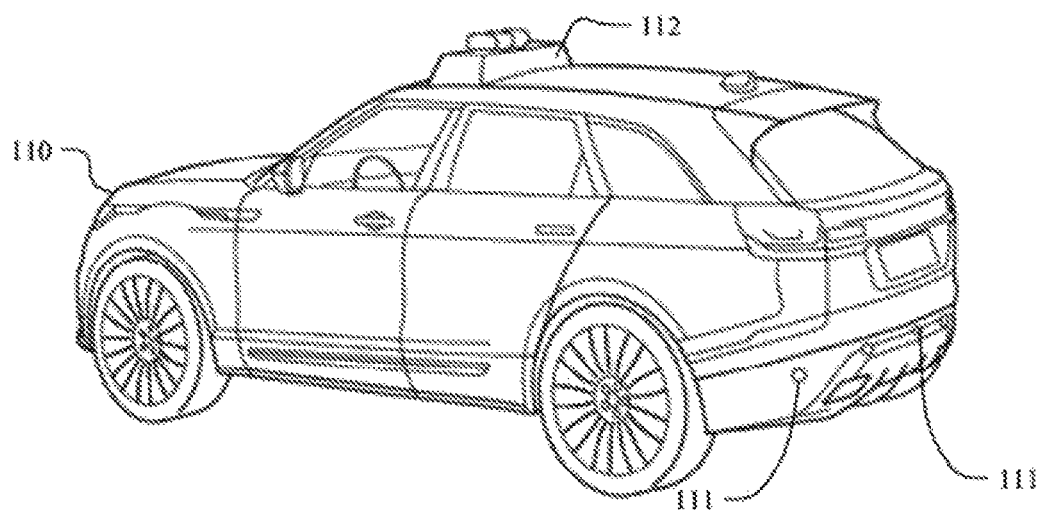

FIGS. 1A and 1B illustrate an example vehicle 110 with example sensors. Vehicle 110 may be a manually driven vehicle or an autonomous vehicle. In particular embodiments, vehicle 110 may include radar antenna 111 and a plurality of sensors 112. The radar antenna 111 may be a radar antenna array that includes multiple antennas. Each antenna in the antenna array may be capable of steering a radar signal in multiple different directions. In particular embodiments, radar antenna 111 may be a phased array antenna which may be able to steer its transmission signal with traditional beamforming techniques. Radar antenna 111 may be configured to detect the presence and location of any number of any type of object within the environment, including people, traffic signals, animals, other vehicles, bicycles, buildings, curb sides, mailboxes, or any other object. As an example, the radar antenna 111 may emit a radar signal that is reflected off one or more objects back to a receiver associated with the radar antenna 111. The radar antenna 111 may also be configured to transmit data to another vehicle (e.g., the operations-control vehicle) or an external server (e.g., associated with an external base station or drone) by modulating the phase, amplitude, or frequency of the emitted signal. The plurality of sensor 112 may include one or more LIDAR sensors configured to emit a light beam to measure the distance to various objects in the external environment, one or more optical cameras configured to take color image profiles of the environment and process the data collected to read signs, navigate the vehicle along road markings, recognize moving or stationary objects relevant to the movement of the vehicle, and other important visual driving cues. In addition, the plurality of sensors 112 may include infrared cameras (e.g., for night vision), stereo vision (e.g., for spotting hazards such as pedestrians or tree branches), ultrasound (e.g., for parking and obstacle detection), GPS, accelerometers, gyroscopes, other relevant sensors, and any combination thereof.

Figure 2:
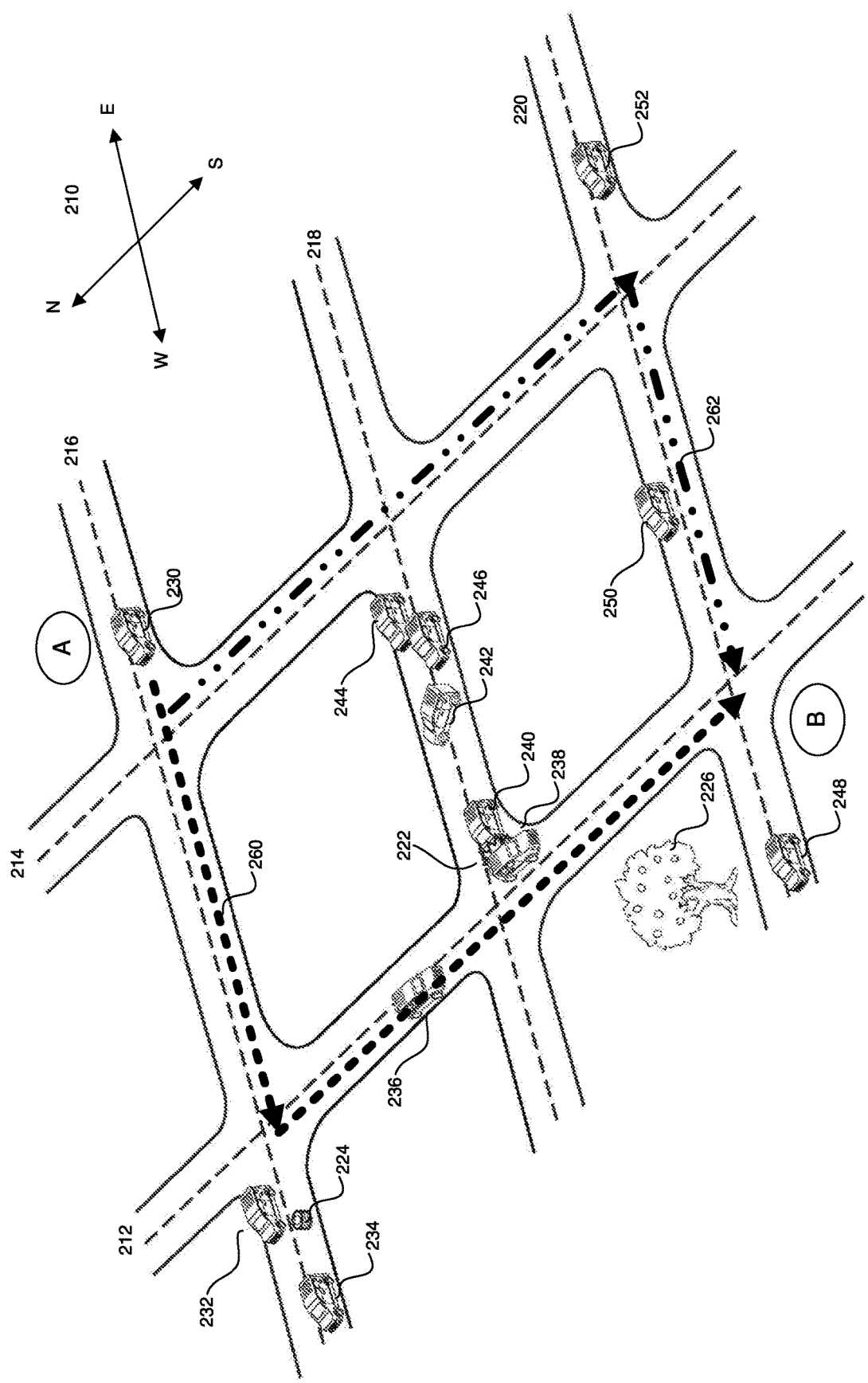
FIG. 2 illustrates an example perspective view of vehicles moving along a route.

FIG. 2 illustrates an example perspective view of vehicles moving along a route. In particular embodiments, a plurality of vehicles are moving from the east to the west as indicated by compass 210. Specifically, this example roadway includes two roads 212 and 214 going in the north-south direction, and three roads 216, 218, and 220 going in the east-west direction. As shown in FIG. 2, there are a number of issues and road hazards, including a vehicular accident 222 at the intersection of road 212 and road 218, and a tire 224 in the road near the intersection of road 212 and road 216. In addition, while not an immediate road hazard, there is a tree 226 located near the intersection of roads 212 and 220. The plurality of vehicles on the road include vehicles 232, 234, 236, 238, 240, 242, 244, 246, 248, 250, and 252. Vehicles 232 and 234 are located around the tire 224 in the road, and because vehicles 232 and 234 have sensors and radar similar to the sensors 112 and radar 111 described above for vehicle 110, vehicles 232 and 234 can use these sensors and radar to sense the location of the tire 224 on the road in order to avoid it. In addition, vehicle 230 may also sense the tire 224 in order to avoid the tire 224 as it is driving closer to the tire 224 using sensors and radar similar to the sensors 112 and radar 111 described above for vehicle 110. However, at current location of vehicle 230, it may not immediately sense the tire 224 due to the distance between the vehicle and the tire.

Vehicles 238 and 240 are the vehicles involved in the vehicular accident 222 at the intersection of road 212 and road 218. Vehicles 242, 244, 246, and 236 are located around the vehicular accident 222, and thus because these vehicles all have sensors and radar similar to the sensors 112 and radar 111 described above for vehicle 110, vehicles 242, 244, 246, and 236 can use these sensors and radar to determine the location of the vehicle accident 222 on the road in order to avoid it. However, vehicle 230 cannot sense the accident 222 until it is driving closer to the location of the accident 222.

Vehicles 248 and 250 are located around the tree 226 and because vehicles 232 and 234 have sensors and radar similar to the sensors 112 and radar 111 described above for vehicle 110, vehicles 232 and 234 can use these sensors and radar to sense the location of the tree 226. Vehicle 252 may also be able to sense the location of the tree 226, but may not be able to do so until vehicle 252 drives closer to the location of the tree 226.

In particular embodiments, vehicle 230 may want to move from location A at the intersection of road 214 and road 216 to location B at the intersection of road 212 and road 220. Vehicle 230 has two routes it can take: a first route 260 and a second route 262. If the vehicle 230 is moving from location A to location B, vehicle 230 may collect information from the variety of sensors discussed above and process the information at the vehicle level to determine whether the collected information may result in updates or revisions to routing and/or handling of the vehicle. As an example, based on only information collect from the variety of sensors at the vehicle level, vehicle 230 may select route 260, which would position vehicle 230 in the vicinity of the vehicular accident 222, which may result in a slowdown when vehicle 230 is in the vicinity of the accident. Since vehicle 230 is not in a position to collect information on the vehicular accident 222, it may not be able to reroute the vehicle to bypass the vehicular accident 222.

However, as discussed above, vehicles may collect the information from the variety of sensors and send the information to an external server for processing. As an example, if a vehicle determines that there is an obstacle or accident on the road ahead of the vehicle based on sensor information, the vehicle may send the information to an external server (e.g., a transportation management server) so that other vehicles in the area can be informed of the presence of the obstacle or accident on the road. As such, vehicle 230 may be able to download information on the vehicular accident 222, and then reroute to take route 262 to drive from location A to location B. However, as discussed above, in a situation where the sensors of the vehicle may be collecting a plethora of information of the surrounding environment, in addition to information collected about the vehicle itself (e.g., diagnostic information, sensor status, etc.), the vehicle itself may not have enough processing power to assess all the collected information and make time-sensitive updates and revisions to routing and/or handling of the vehicle. In addition, since the vehicle may only be able to collect information on its immediate surroundings and the vehicle itself, the vehicle may also be receiving information from external servers, including routing details, environment details, weather details, vehicle status details, any other relevant details and information, and any combination thereof. As shown in FIG. 2, vehicle 230 only has a few seconds to process information collected and downloaded from the external server in order to make a determination to turn onto road 214 to follow route 262 in order to bypass the vehicular accident 222. Because this additional information downloaded to the vehicle may further burden the processing power of the vehicle to assess the information in determining whether to update or revise routing and/or handling of the vehicle, in addition to the inherent latency issues with receiving information from external servers, some of the information that may be relevant to the routing and/or handling of vehicle 230 may not be downloaded or processed in a timely manner, and thus vehicle 230 may not be able to make changes to the routing and/or handling of the vehicle in a timely manner and despite receiving information to do so. As such, even if vehicle 230 receives information that would result in the determination to take route 262 to bypass the vehicular accident 22, it may not be able to process the information and make the determination to do so in time.

Figure 3:
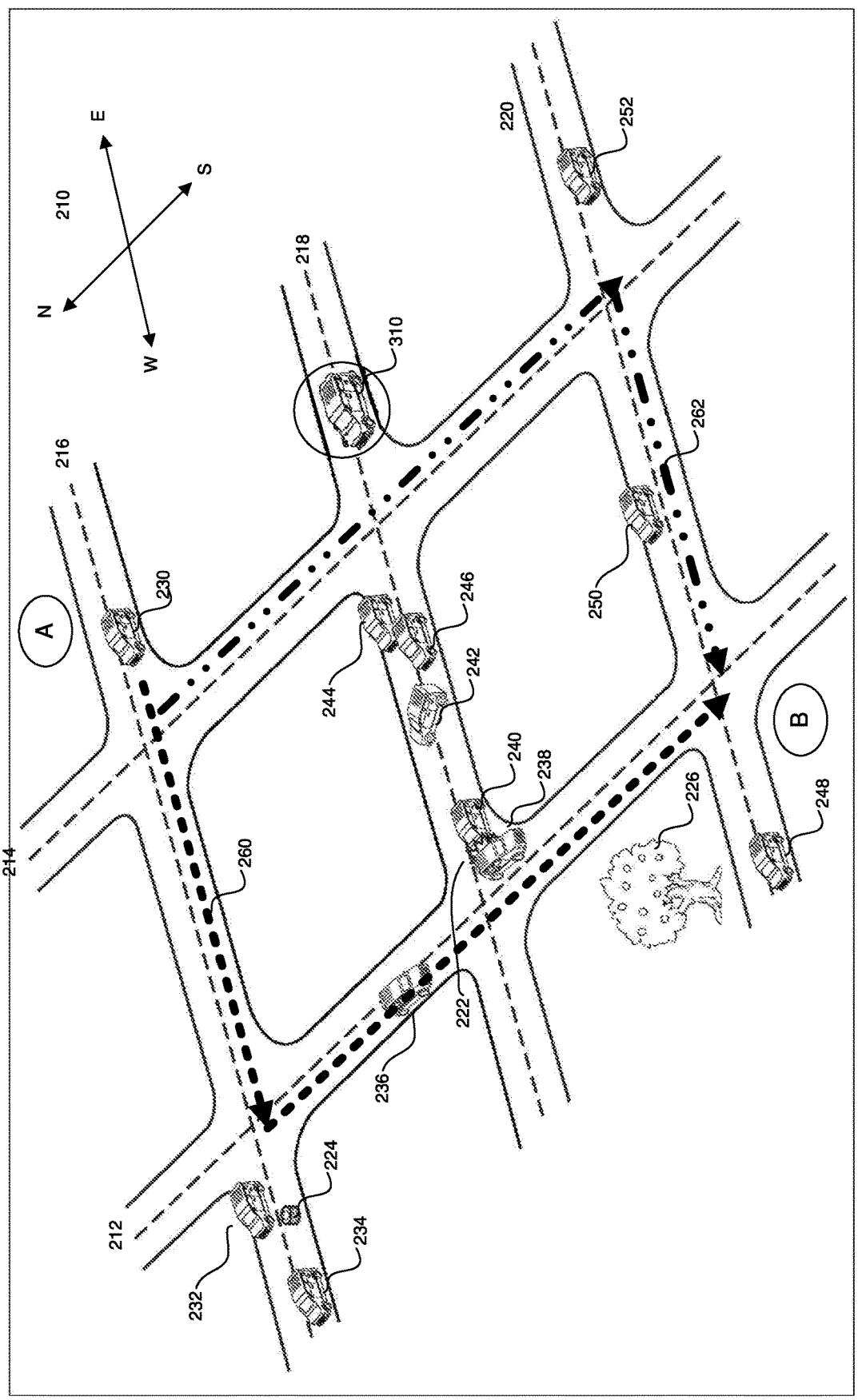
FIG. 3 illustrates an example perspective view of vehicles moving along a route and an operations-control vehicle that collects, processes, and disseminates information.

FIG. 3 illustrates an example perspective view of vehicles moving along a route and an operations-control vehicle that collects, processes, and disseminates information. Similar to FIG. 2, FIG. 2 illustrates an example roadway with two roads 212 and 214 going in the north-south direction, and three roads 216, 218, and 220 going in the east-west direction. there are a number of issues and road hazards, including a vehicular accident 222 at the intersection of road 212 and road 218, and a tire 224 in the road near the intersection of road 212 and road 216. In addition, while not an immediate road hazard, there is a tree 226 located near the intersection of roads 212 and 220. The plurality of vehicles on the road include vehicles 232, 234, 236, 238, 240, 242, 244, 246, 248, 250, and 252. Vehicles 232 and 234 are located around the tire 224 in the road, vehicles 238 and 240 are the vehicles involved in the vehicular accident 222 at the intersection of road 212 and road 218, vehicles 242, 244, 246, and 236 are located around the vehicular accident 222, and vehicles 248 and 250 are located around the tree 226.

In particular embodiments, as illustrated in FIG. 3, an operations-control vehicle 310, which may be a type of centralized "brain" vehicle, is configured to receive sensor data and other relevant information from a plurality of vehicles around it, process and synthesize all the information received in a process including sensor fusion of all sensor data and other relevant information received, and then redistribute the processed information and/or generated instructions relevant to the routing and/or handling of the vehicles to the plurality of vehicles. This operations-control vehicle 310 may have more processing power and better sensors than a typical vehicle. As an example, the operations-control vehicle may be equipped with faster processors, more memory, more power, super sensors (e.g., better LiDAR, better cameras, better radar), and other state-of-the-art hardware. This hardware may allow the operations-control vehicle to act as a "swarm brain" for all vehicles in a fleet, from collecting and processing information to making decisions on what information to send to which vehicles of the fleet.

As an example, as shown in FIG. 3, the operations-control vehicle 310 may receive sensor data and other relevant information from vehicles 232, 234, 236, 238, 240, 242, 244, 246, 248, 250, and 252. The operations-control vehicle 310 may receive sensor data and other relevant information from vehicles within a predetermined geographic location, within a predetermined distance from the operations-control vehicle 310, based on any other relevant determination, or dynamically determined based on any combination thereof. For processing purposes, the sensor data and other relevant information collected from the vehicles is time synchronized (e.g., by time stamping, GPS timing component, etc.) so that all the information can be combined and consolidated. The operations-control vehicle 310 may request the sensor data and other relevant information from these vehicles, or alternatively, the vehicles may automatically send the sensor data and other relevant information to the operations-control vehicle 310 in a predetermined time basis, on an event basis (e.g., when an accident occurs, when an object is identified, etc.), or other suitable basis. In addition, the operations-control vehicle 310 may request, or alternatively, the vehicles may automatically send the operations-control vehicle 310 information on their routes and geographic locations and destinations.

The operations-control vehicle 310 has superior sensors compared to other vehicles, and thus collects sensor data and other relevant information for the vehicle itself and the surrounding geographic area. In addition, since the operations-control vehicle 310 has more processing power than other vehicles, the operations-control vehicle 310 may collect and process all sensor data and other relevant information collected from all the vehicles, in addition to the sensor data from the operations-control vehicle 310 itself. As an example, the processing of all the sensor data of all the vehicles and the operations-control vehicle 310 allows the operations-control vehicle 310 to view and access the geographic area surrounding the vehicles from many different points of view (e.g., from each of the vehicle's point-of-view in addition to its own point-of-view) and determine and/or assess any situations of interest (e.g., a predefined event) from multiple different perspectives. A situations of interest (or predefined event) may include any events that would potentially affect the routing and maneuvering instructions of any of the vehicles, such as a vehicular accident (e.g., vehicular accident 222), an object within the driving lane that may cause the vehicle to move out of its way (e.g., a tire 224 in the road), an object around the driving lane that may potentially affect the movement of the vehicle (e.g., a tree 226), other relevant situations, or any combination thereof.

Once the operations-control vehicle 310 processes the sensor data and other relevant information from all of the vehicles, including itself, the operations-control vehicle 310 may then detect the presence of a predefined event that would likely require one or more of the vehicles to revise or update their route information to avoid or bypass the predefined event with the least impact and inconvenience to the passengers of the vehicle. As an example, in the situation shown in FIG. 3, based on the analysis of the collected sensor data and other relevant information from vehicle 230, the operations-control vehicle 310 may determine that the tire 224 and the tree 226 will likely not impact the route selection of vehicle 230 between first route 260 or second route 262. However, the operations-control vehicle 310 may determine that the vehicular accident 222 will likely impact the route selection of vehicle 230 by determining that second route 262 is superior to first route 260 in terms of time efficiency and least impact and inconvenience to the passengers of the vehicle. After making this determination, the operations-control vehicle 310 may send this information to vehicle 230 as instructions for vehicle 230 to take second route 262. As an example, the operations-control vehicle 310 may send executable instructions (e.g., change route to second route 262) to vehicle 230, and vehicle 230 executes these instructions to update its route selection. Alternatively, the operations-control vehicle 310 may simply send the relevant information to vehicle 230 (e.g., vehicle accident 222 located at the intersection of road 212 and road 218), and vehicle 230 then processes the information to make a determination as to how to update the route selection. In this situation, the operations-control vehicle may simply collect and more efficiently and effectively preprocess the sensor information from the vehicles using its more advanced hardware and software components, and then provide the sensor information to all vehicles that may find the information to be relevant to routing and/or handling of the vehicle. As such, vehicle 230 itself would be responsible for determining whether the information is relevant and how to update the route selection based on the information.

In particular embodiments, the operations-control vehicle 310 may send all relevant predefined event information to all vehicles within a predetermined geographic location, within a predetermined distance from the operations-control vehicle 310, or other relevant factor determining whether to send information to the vehicles. As an example, in FIG. 3, the operations-control vehicle 310 may send the predefined event information of the vehicular accident 222 to the vehicles that may not have known about the situation based on only processing data from their own sensors, including vehicles 232, 234, 248, 262, and 252. In this situation, the operations-control vehicle 310 may determine a priority for sending this information based on the importance of this information to the vehicle, starting with vehicle 230 as highest importance since the operations-control vehicle 310 knows that vehicle 230 is traveling along a route that will likely put vehicle 230 in contact with the vehicular accident 222, and then to vehicles of lower importance, such as vehicles 250 and 252 which may not necessarily come into contact with the vehicular accident 222 but may nonetheless deal with consequences from the vehicular accident 222 (e.g., more vehicles traveling along road 220 to bypass the vehicular accident 222). In addition, the operations-control vehicle 310 may send information on one or more of the predefined events based on the priority of the predefined events. As an example, the vehicular accident 222, which will likely impact the routing decisions of one or more vehicles on the roads, will likely be a high priority event. For similar reasons, the tire 224 in the road would also likely be a high priority event. On the other hand, the location of the tree 226 is likely a low priority event because it is unlikely to impact any routing decisions made by any of the vehicles.

In particular embodiments, the operations-control vehicle 310 may connect to multiple vehicles simultaneously to receive/request data or to send data to the vehicles. As an example, the operations-control vehicle 310 may receive sensor data and other relevant information from a plurality of vehicles, and then use this information to check the sensors of each of the vehicles against the other vehicles to diagnose any issues with the sensors. As another example, the operations-control vehicle 310 may scan a geographic area for jammers or foreign radars, detect the signal characteristics for jammers or foreign radars, and then communicate this information to the vehicles in the geographic area to instruct them to switch radar frequency or adopt other mitigating solutions. As yet another example, the operations-control vehicle 310 may act as a drive-assist vehicle for an autonomous vehicle that has been disable due to sensor malfunction by escorting the disabled autonomous vehicle by sending driving and routing instructions to the vehicle to a repair shop, which may be more efficient than dispatching a towing truck to move a disabled autonomous vehicle.

Figure 4:
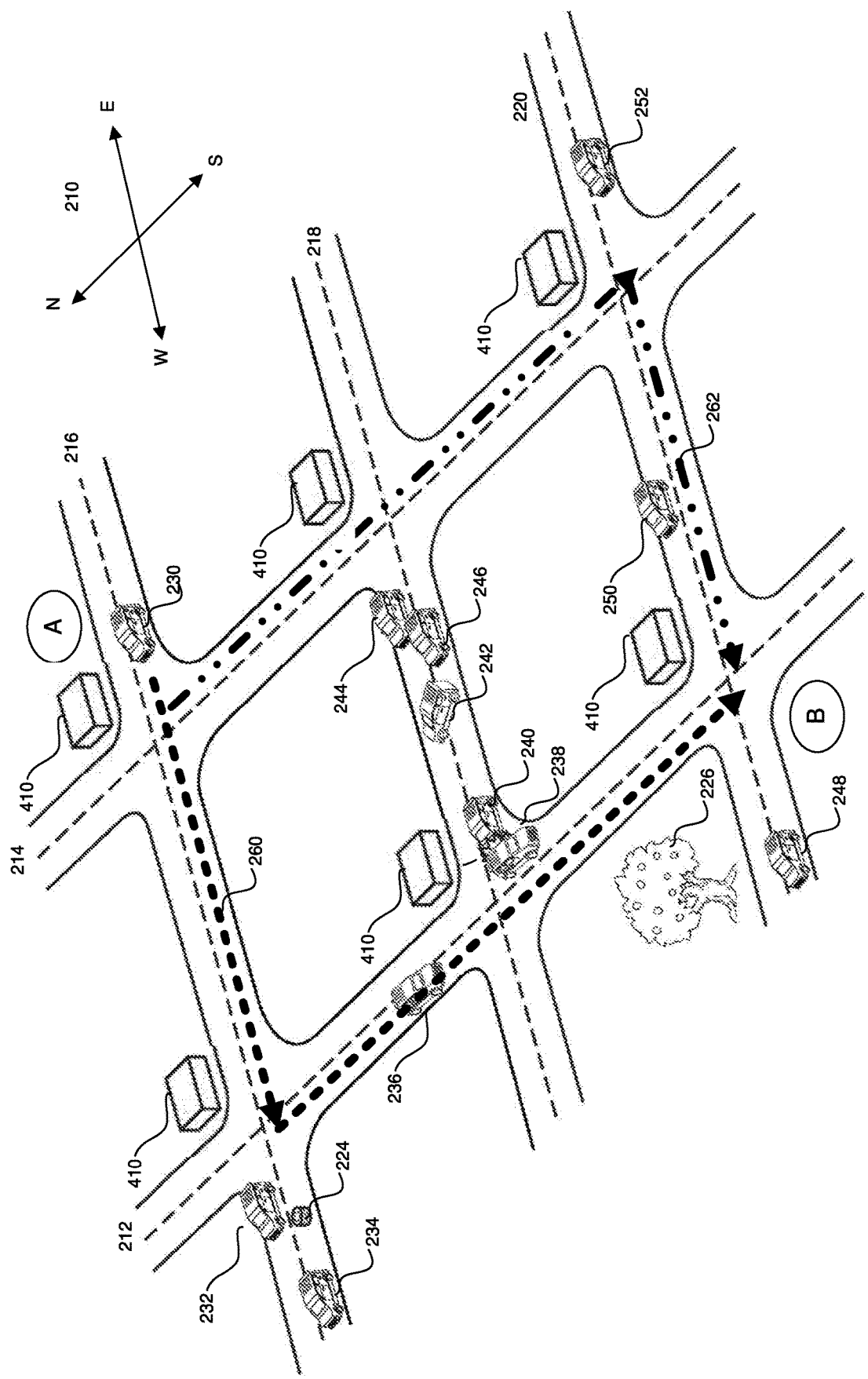
FIG. 4 illustrates an example perspective view of vehicles moving along a route and roadside base stations that collects, processes, and disseminates information.

FIG. 4 illustrates an example perspective view of vehicles moving along a route and roadside base stations that collects, processes, and disseminates information. Similar to FIG. 2, FIG. 4 illustrates an example roadway with two roads 212 and 214 going in the north-south direction, and three roads 216, 218, and 220 going in the east-west direction. there are a number of issues and road hazards, including a vehicular accident 222 at the intersection of road 212 and road 218, and a tire 224 in the road near the intersection of road 212 and road 216. In addition, while not an immediate road hazard, there is a tree 226 located near the intersection of roads 212 and 220. The plurality of vehicles on the road include vehicles 232, 234, 236, 238, 240, 242, 244, 246, 248, 250, and 252. Vehicles 232 and 234 are located around the tire 224 in the road, vehicles 238 and 240 are the vehicles involved in the vehicular accident 222 at the intersection of road 212 and road 218, vehicles 242, 244, 246, and 236 are located around the vehicular accident 222, and vehicles 248 and 250 are located around the tree 226. In addition, base stations 410 may be located at all the intersections of roads 212, 214, 216, 218, and 220.

In particular embodiments, the one or more base stations 410 (e.g., the network of base stations) may play the same or similar role as the operations-control vehicle 310 discussed above, by receiving sensor data and other relevant information from a plurality of vehicles around it, processing and synthetizing all the information received in a process including sensor fusion of all sensor data and other relevant information received, and then redistributing the processed information and/or generated instructions relevant to the routing and/or handling of the vehicles to the plurality of vehicles. To do this, the one or more base stations 410 communicate information to and from the vehicles (e.g., vehicles 230, 232, 234, 236, 238, 240, 242, 244, 246, 248, 250, and 252) via the radar antennas on the vehicle. In particular embodiments, radar antenna 111 on vehicle 230 (similar to vehicle 110) may be able to beamform multiple antenna signals in multiple different directions. Radar antenna 111 may be an antenna array that includes multiple antennas that generate multiple signals, and each signal may be steered in a different direction. Thus, radar antenna 111 be configured to allocate some of its signaling capabilities to object detection and some of its signaling capabilities to data communication. As an example, vehicle 230 comprises a radar antenna 111 that may simultaneously detect objects in the environment and communicate with the antenna of base station 410.

If the radar antenna 111 of vehicle 230 is moving relative to the antenna of base station 410, the radar antenna 111 may need to beamform to maintain a connection with the antenna of base station 410. As an example, radar antenna 111 of vehicle 230 may have established a wireless connection with base station 410 that is located on a street corner. During the communication session, vehicle 230 may turn left on the street corner. To maintain the communication session and transmit more data, radar antenna 111 may beamform its signal (e.g., via phased array beam steering) to the left such that it maintains a maximum signal-to-noise ratio (SNR) with the base station 410 and remains directed at the base station 410. In particular embodiments, the radar antenna 111 need not maintain the communication channel through beamforming. Beamforming may help maintain a maximum SNR, which may facilitate data throughput. The radar antenna 111 may also or alternatively operate in a broadcasting mode in which data is broadcast to different nodes, which may be base stations 410 or other vehicles on the road.

The antenna of the base station 410 may be configured to receive a modulated signal and either decode the signal itself or relay the signal to another computing device that may then decode the signal into useful information. The data transmitted by the signal emitted from radar 111 may include information about the vehicle (e.g., speed, location, or system diagnostics such as battery life and tire pressure), information about the vehicle's surroundings (e.g., imaging data, a list of objects around the vehicle, traffic information), or other suitable information. The antenna of the base station 410 may likewise be able to transmit information to the vehicle via the radar antenna 111. The information transmitted from the antenna of base station 410 to the vehicle may include information about nearby vehicles, traffic information about areas up ahead on the vehicle's driving route, instructions from a main network controller, or any other suitable type of information.

In particular embodiments, for a particular vehicle 230, it may be desirable for a transportation management system (e.g., transportation management system 702) to have available (1) the current location of the vehicle, and (2) the location of each base station installed in the infrastructure of the region. This may allow the vehicle to more quickly establish a communication session with an infrastructure base station, because the radar antenna 111 will not need to perform a broad search (with, e.g., a broadcast signal) prior to establishing the communication session. Determining the location of the vehicle may be accomplished via GPS data and other sensor data that is transmitted via the wireless broadband network. The location of each base station that is installed in the infrastructure may be recorded at the time of installation. The location of the base station may include GPS coordinates and an elevation, or alternatively, may include x, y, z coordinates in a three-dimensional map. In particular embodiments, the navigation management system may generate or otherwise access a high definition three-dimensional map (3D map) of a region. The 3D map may include the location of each base station antenna in the region. The 3D map may also include the location of each base station antenna that is yet to be installed. As an example, it may be determined that a base station antenna is to be installed on a particular intersection location. The 3D map may already have the precise location (e.g., x, y, z coordinates, GPS location and elevation) of the location on the intersection where the base station antenna will be installed. GPS may provide a rough localization for the location of the base stations. Additional information, including triangularization, may improve the accuracy of the localization.

In particular embodiments, as soon as the base station antenna receives a signal from the radar antenna, it may be able to determine the location of the radar antenna relative to its own position based on the azimuth, elevation, and signal strength of incoming signal. The base station antenna may then immediately transmit the radar antenna location to transportation management system. This may enable management system to determine the location of the vehicle associated with the radar antenna. Additionally, if the vehicle knows the path that it will navigate (e.g., by a navigation system in the vehicle), it may download the locations of each base station antenna along its route. This download may be done over a wireless broadband network (e.g., 4G, LTE). Then, as the vehicle travels along the route, its radar antenna may be able to quickly locate the nearest base station and begin transmitting data to it, without needing to broadcast a handshake signal and locate the nearest base station antenna, even when handshake signals may still be useful.

In particular embodiments, the data that is sent via radar antenna 111 to the antennas of base station 410 may be prioritized according to a prioritization policy set by the transportation management system associated with vehicle 230. The prioritization policy may indicate which data types should be transmitted first. In many cases, vehicle 230 may only have a few moments (e.g., seconds or minutes) to transmit data to the network. For example, if the vehicle is stopped at an intersection, radar antenna 111 may establish a wireless connection with a nearby base station antenna and begin transmitting. But once vehicle 230 begins driving again, all or some of the antenna radar 111 resources may need to be used for object detection; thus, not all of the data may be offloaded during the traffic stop. Therefore, it may be desirable to transfer the most important or urgent data first, so that the most important or urgent data is more likely to be communicated to the management system. The data may be prioritized as follows. First, radar antenna 111 may transmit vehicle vitals that are critical to the safety of the rider or surrounding pedestrians, riders or drivers. Such information may include information about the operability of the sensors. If a sensor is not performing optimally, but the vehicle is still safe to operate, it may still be urgent and important to transmit data about the under-performing sensor. The information may also include data about the vehicle's vitals, such as battery life, tire pressure, accidents, engine diagnostics, and other information pertinent to the vehicle's operability. Then, radar antenna 111 may transmit the data that the sensors have gathered during normal operation of the vehicle. This data may include imaging data gathered by LiDAR sensors, lists and locations of objects surrounding the vehicle 230, images captured by an optical camera, or any other information that describes or characterizes the environment.

Figure 5:
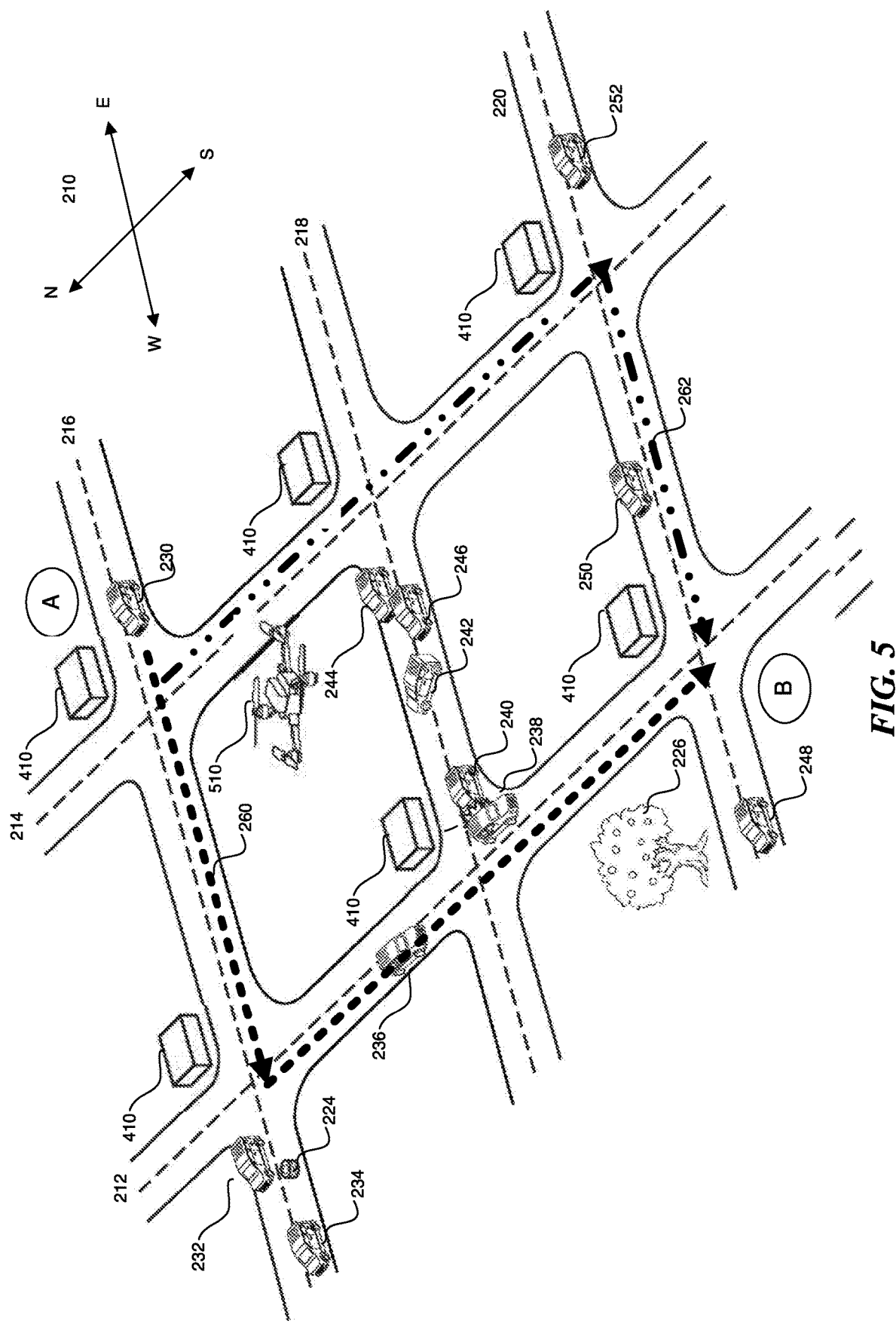
FIG. 5 illustrates an example perspective view of vehicles moving along a route and an operations-control drone that collects, processes, and disseminates information.

FIG. 5 illustrates an example perspective view of vehicles moving along a route and an operations-control drone that collects, processes, and disseminates information. Similar to FIGS. 2 and 4, FIG. 5 illustrates an example roadway with two roads 212 and 214 going in the north-south direction, and three roads 216, 218, and 220 going in the east-west direction. there are a number of issues and road hazards, including a vehicular accident 222 at the intersection of road 212 and road 218, and a tire 224 in the road near the intersection of road 212 and road 216. In addition, while not an immediate road hazard, there is a tree 226 located near the intersection of roads 212 and 220. The plurality of vehicles on the road include vehicles 232, 234, 236, 238, 240, 242, 244, 246, 248, 250, and 252. Vehicles 232 and 234 are located around the tire 224 in the road, vehicles 238 and 240 are the vehicles involved in the vehicular accident 222 at the intersection of road 212 and road 218, vehicles 242, 244, 246, and 236 are located around the vehicular accident 222, and vehicles 248 and 250 are located around the tree 226. In addition, base stations 410 may be located at all the intersections of roads 212, 214, 216, 218, and 220, and an unmanned aerial vehicle (e.g., a drone) 510 is located above the geographic area.

In particular embodiments, the unmanned aerial vehicle 510 may play the same or similar role as the operations-control vehicle 310 discussed above, by receiving sensor data and other relevant information from a plurality of vehicles around it, processing and synthetizing all the information received in a process including sensor fusion of all sensor data and other relevant information received, and then redistributing the processed information and/or generated instructions relevant to the routing and/or handling of the vehicles to the plurality of vehicles. To do this, the unmanned aerial vehicle 510 may communicate information to and from the vehicles (e.g., vehicles 230, 232, 234, 236, 238, 240, 242, 244, 246, 248, 250, and 252) via the radar antennas on the vehicle, and also communicate information to and from the one or more base stations 410 via the antennas on the base stations.

Figure 6:
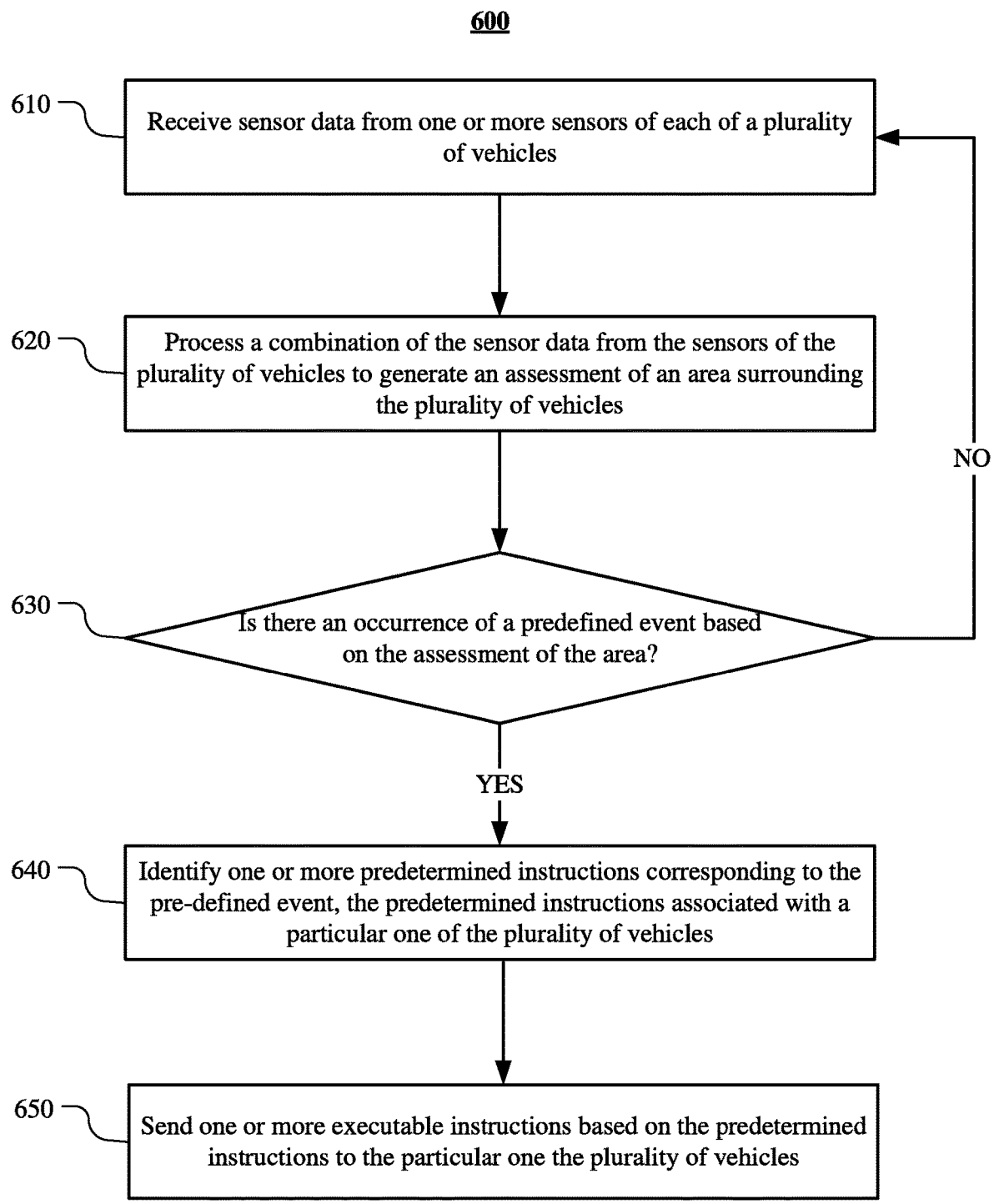
FIG. 6 illustrates an example of a method for receiving, processing, and disseminating sensor information and routing instructions to a plurality of vehicles.

FIG. 6 illustrates an example method 600 for receiving, processing, and disseminating sensor information and routing instructions to a plurality of vehicles. The method may begin at step 610, where an operations-control vehicle may receive sensor data from one or more sensors of each of a plurality of vehicles. At step 620, the operations-control vehicle may process a combination of the sensor data from the sensors of the plurality of vehicles to generate an assessment of an area surrounding the plurality of vehicles. At step 630, the operations-control vehicle may determine whether there is an occurrence of a predefined event based on the assessment of the area. If it is determined that there is an occurrence of a predefined event based on the assessment of the area (i.e., step 630 is YES), then at step 640, the operations-control vehicle may identify one or more predetermined instructions corresponding to the pre-defined event, the predetermined instructions associated with a particular one of the plurality of vehicles. If, on the other hand, the it is determined that there is no occurrence of a pre-defined event based on the assessment of the area (i.e., step 630 is NO), then the method goes back to step 610. Then, at step 650 following step 640, the operations-control vehicle may send one or more executable instructions based on the predetermined instructions to the particular one the plurality of vehicles.

In particular embodiments, the sensor data from the sensors of the plurality of vehicles is automatically sent from each of the plurality of vehicles. Alternatively, prior to receiving the sensor data, the operations-control vehicle may request sensor data from one or more of the plurality of vehicles. In particular embodiments, the processing of the sensor data from the plurality of vehicles comprises synchronizing the sensor data for all vehicles of the plurality of vehicles based on the time stamps, generating one or more points-of-view of a geographic area based on the synchronized sensor data, and assessing the one or more points-of-view of the geographic area to determine the occurrence of the predetermined event. In particular embodiments, the particular one of the plurality of vehicles that the predetermined instructions are associated with may be selected by determining one or more of the plurality of vehicles that will make a route alteration based on the occurrence of the predefined event, determining a priority associated with each of the plurality of vehicles, and selecting a vehicle with the highest priority as the particular one of the plurality of vehicles, wherein the priority is determined based on at least one of a degree of route alteration associated with a vehicle due to the occurrence of the predefined event, a distance from a vehicle to a location of the predefined event, a current route of a vehicle, or a distance from a vehicle to a location of the autonomous vehicle. In particular embodiments, the occurrence of the event may be detected by determining a relevant route associated with the vehicles, requesting a report of any events on the relevant route from the vehicles or from other vehicles (e.g., other vehicles different from the original vehicles), and receiving the report of events on the relevant route.

In particular embodiments, the executable instructions sent to the particular one of the plurality of vehicles may instruct the particular one of the plurality of vehicles to make one or more route alterations. Alternatively, the executable instructions sent to the particular one of the plurality of vehicles may instruct the particular one of the plurality of vehicles to process and assess additional sensor data from one or more other vehicles. In particular embodiments, the operations-control vehicle may assess a state of the sensors on each of the plurality of vehicles based on a comparison of the sensor data from each of the plurality of vehicles, and the determine whether to calibrate the sensors of the one or more vehicles based on the comparison (e.g., in the situation where a sensor is determined to be faulty). In particular embodiments, the autonomous vehicle may be an unmanned aerial vehicle.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for receiving, processing, and disseminating sensor information and routing instructions to a plurality of vehicles including the particular steps of the method of FIG. 6, this disclosure contemplates any suitable method for receiving, processing, and disseminating sensor information and routing instructions to a plurality of vehicles including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
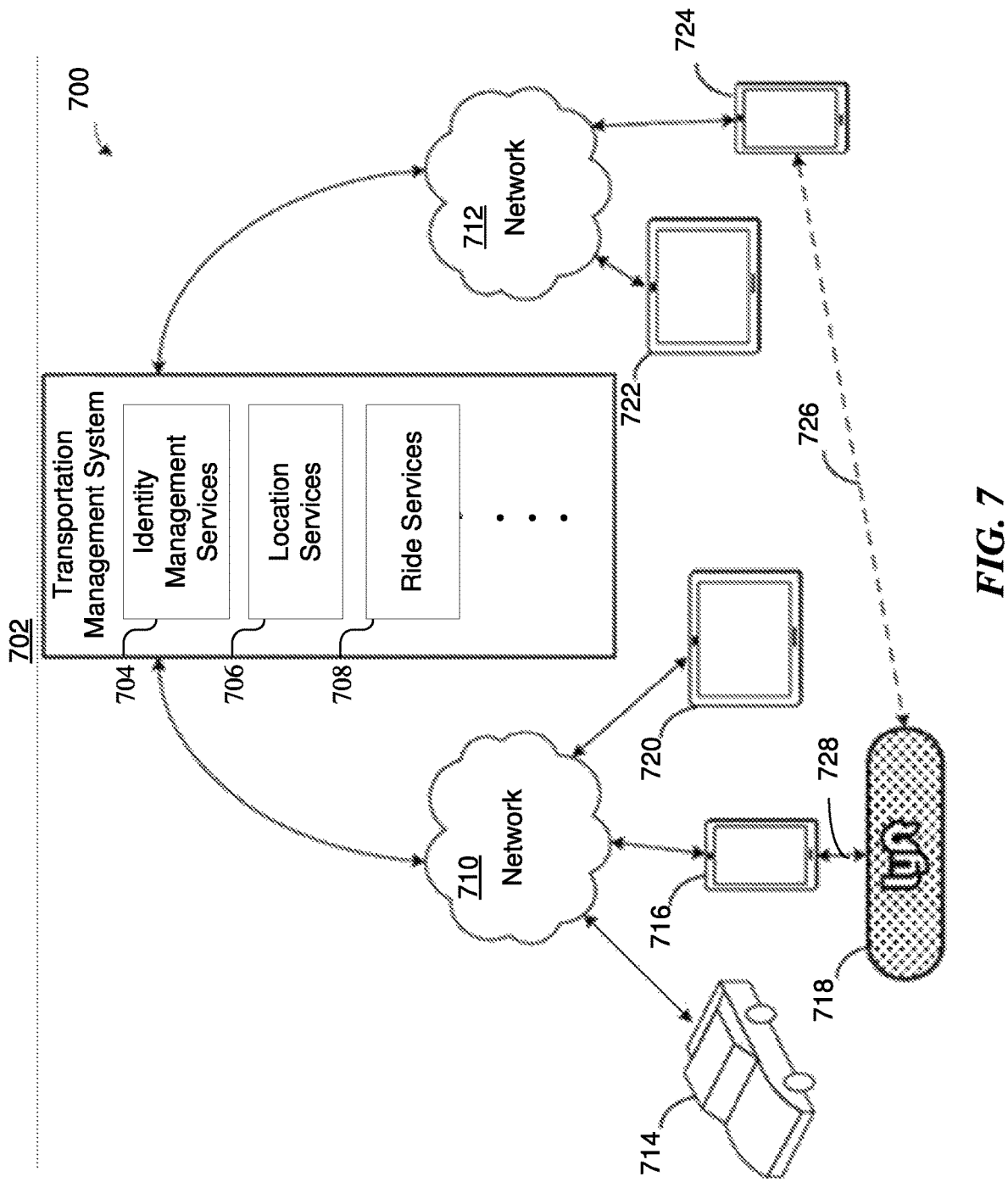
FIG. 7 illustrates an example block diagram of a transportation management environment.

FIG. 7 shows a transportation management environment 700, in accordance with particular embodiments. For example, a transportation management system 702 executing on one or more servers or distributed systems may be configured to provide various services to ride requestors and providers. In particular embodiments, the transportation management system 702 may include software modules or applications, including, e.g., identity management services 704, location services 706, ride services 708, and/or any other suitable services. Although a particular number of services are shown as being provided by system 702, more or fewer services may be provided in various embodiments. In addition, although these services are shown as being provided by the system 702, all or a portion of any of the services may be processed in a distributed fashion. For example, computations associated with a service task may be performed by a combination of the transportation management system 702 (including any number of servers, databases, etc.), one or more devices associated with the provider (e.g., devices integrated with the managed vehicles 714, provider's computing devices 716 and tablets 720, and transportation management vehicle devices 718), and/or one or more devices associated with the ride requestor (e.g., the requestor's computing devices 724 and tablets 722). In particular embodiments, the transportation management system 702 may include one or more general purpose computers, server computers, distributed computing systems, clustered computing systems, cloud-based computing systems, or any other computing systems or arrangements of computing systems. The transportation management system 702 may be configured to run any or all of the services and/or software applications described herein. In particular embodiments, the transportation management system 702 may include an appropriate operating system as well as various server applications, such as web servers capable of handling hypertext transport protocol (HTTP) requests, file transfer protocol (FTP) servers, database servers, etc.

In particular embodiments, identity management services 704 may be configured to, e.g., perform authorization services for requestors and providers and manage their interactions and data with the transportation management system 702. This may include, e.g., authenticating the identity of providers and determining that they are authorized to provide services through the transportation management system 702. Similarly, requestors' identities may be authenticated to determine whether they are authorized to receive the requested services through the transportation management system 702. Identity management services 704 may also manage and control access to provider and requestor data maintained by the transportation management system 702, such as driving and/or ride histories, vehicle data, personal data, preferences, usage patterns as a ride provider and as a ride requestor, profile pictures, linked third-party accounts (e.g., credentials for music or entertainment services, social-networking systems, calendar systems, task-management systems, etc.) and any other associated information. The management service 704 may also manage and control access to provider/requestor data stored with and/or obtained from third-party systems. For example, a requester or provider may grant the transportation management system 702 access to a third-party email, calendar, or task management system (e.g., via the user's credentials). As another example, a requestor or provider may grant, through a mobile device (e.g., 716, 720, 722, and 724), a transportation application associated with the transportation management system 702 access to data provided by other applications installed on the mobile device. Such data may be processed on the client and/or uploaded to the transportation management system 702 for processing, if so desired.

In particular embodiments, the transportation management system 702 may provide location services 706, which may include navigation and/or traffic management services and user interfaces. For example, the location services 706 may be responsible for querying devices associated with the provider (e.g., vehicle 714, computing device 716, tablet 720, transportation management vehicle device 718) and the requester (e.g., computing device 724 and tablet 722) for their locations. The location services 706 may also be configured to track those devices to determine their relative proximities, generate relevant alerts (e.g., proximity is within a threshold distance), generate navigation recommendations, and any other location-based services.

In particular embodiments, the transportation management system 702 may provide ride services 708, which may include ride matching and management services to connect a requestor to a provider. For example, after the identity of a ride requestor has been authenticated by the identity management services module 704, the ride services module 708 may attempt to match the requestor with one or more ride providers. In particular embodiments, the ride services module 708 may identify an appropriate provider using location data obtained from the location services module 706. The ride services module 708 may use the location data to identify providers who are geographically close to the requestor (e.g., within a certain threshold distance or travel time) and further identify those who are a good match with the requestor. The ride services module 708 may implement matching algorithms that score providers based on, e.g.: preferences of providers and requestors; vehicle features, amenities, condition, and status; provider's preferred general travel direction, range of travel, and availability; requestor's origination and destination locations, time constraints, and vehicle feature needs; and any other pertinent information for matching requestors with providers. In particular embodiments, the ride services 708 may use rule-based algorithms or machine-learning models for matching requestors and providers.

The transportation management system 702 may communicatively connect to various devices through networks 710 and 712. Networks 710, 712 may include any combination of interconnected networks configured to send and/or receive data communications using various communication protocols and transmission technologies. In particular embodiments, networks 710, 712 may include local area networks (LAN), wide-area network, and/or the Internet, and may support communication protocols such as transmission control protocol/Internet protocol (TCP/IP), Internet packet exchange (IPX), systems network architecture (SNA), and any other suitable network protocols. In particular embodiments, data may be transmitted through networks 710, 712 using a mobile network (such as a mobile telephone network, cellular network, satellite network, or another mobile network), PSTNs (a public switched telephone networks), wired communication protocols (e.g., USB, CAN), and/or wireless communication protocols (e.g., WLAN technologies implementing the IEEE 802.11 family of standards, Bluetooth, Bluetooth Low Energy, NFC, Z-Wave, and ZigBee). In particular embodiments, networks 710, 712 may each include any combination of networks described herein or known to one of ordinary skill in the art.

In particular embodiments, devices within a vehicle may be interconnected. For example, any combination of the following may be communicatively connected: vehicle 714, provider computing device 716, provider tablet 720, transportation management vehicle device 718, requestor computing device 724, requestor tablet 722, and any other device (e.g., smart watch, smart tags, etc.). For example, the transportation management vehicle device 718 may be communicatively connected to the provider computing device 716 and/or the requestor computing device 724. The transportation management vehicle device 718 may connect 726, 728 to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In particular embodiments, users may utilize and interface with one or more services provided by the transportation management system 702 using applications executing on their respective computing devices (e.g., 714, 716, 718, and/or 720), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In particular embodiments, provider computing device 714 may be an add-on device to the vehicle, such as a vehicle navigation system, or a computing device that is integrated with the vehicle, such as the management system of an autonomous vehicle. The computing device may run on any suitable operating systems, such as Android®, iOS®, macOS®, Windows®, Linux®, UNIX®, or UNIX®-based or Linux®-based operating systems, or any other type of operating system or firmware. The computing device may further be configured to send and receive data over the Internet, short message service (SMS), email, and various other messaging applications and/or communication protocols. In particular embodiments, one or more software applications may be installed on the computing device of a provider or requestor, including an application associated with the transportation management system 702. The transportation application may, for example, be distributed by an entity associated with the transportation management system via any distribution channel, such as an online source from which applications may be downloaded and/or via physical media, such as CDs and DVDs. Additional third-party applications unassociated with the transportation management system may also be installed on the computing device. In particular embodiments, the transportation application may communicate or share data and resources with one or more of the installed third-party applications.

Figure 8:
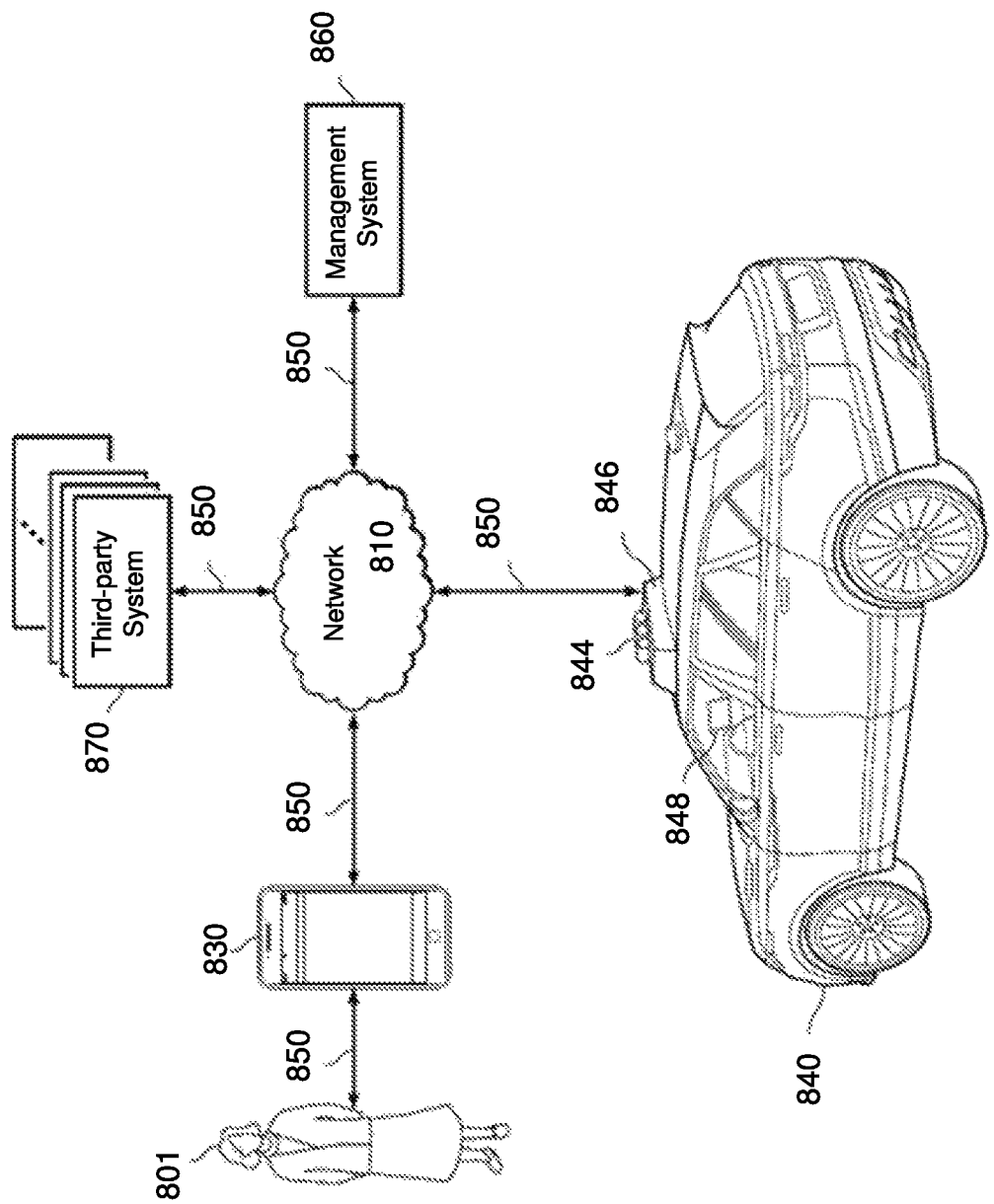
FIG. 8 illustrates an example block diagram of a transportation management environment for matching ride requestors with autonomous vehicles.

FIG. 8 illustrates an example block diagram of a transportation management environment for matching ride requestors with autonomous vehicles. In particular embodiments, the environment may include various computing entities, such as a user computing device 830 of a user 801 (e.g., a ride provider or requestor), a transportation management system 860, an autonomous vehicle 840, and one or more third-party system 870. The computing entities may be communicatively connected over any suitable network 810. As an example and not by way of limitation, one or more portions of network 810 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 8 illustrates a single user device 830, a single transportation management system 860, a single vehicle 840, a plurality of third-party systems 870, and a single network 810, this disclosure contemplates any suitable number of each of these entities. As an example and not by way of limitation, the network environment may include multiple users 801, user devices 830, transportation management systems 860, autonomous-vehicles 840, third-party systems 870, and networks 810.

The user device 830, transportation management system 860, autonomous vehicle 840, and third-party system 870 may be communicatively connected or co-located with each other in whole or in part. These computing entities may communicate via different transmission technologies and network types. For example, the user device 830 and the vehicle 840 may communicate with each other via a cable or short-range wireless communication (e.g., Bluetooth, NFC, WI-FI, etc.), and together they may be connected to the Internet via a cellular network that is accessible to either one of the devices (e.g., the user device 830 may be a smartphone with LTE connection). The transportation management system 860 and third-party system 870, on the other hand, may be connected to the Internet via their respective LAN/WLAN networks and Internet Service Providers (ISP). FIG. 8 illustrates transmission links 850 that connect user device 830, autonomous vehicle 840, transportation management system 860, and third-party system 870 to communication network 810. This disclosure contemplates any suitable transmission links 850, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 850 may connect to one or more networks 810, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 850. For example, the user device 830 may communicate with the transportation management system via a cellular network and the Internet, but communicate with the autonomous vehicle 840 via Bluetooth or a physical wire connection.

In particular embodiments, the transportation management system 860 may fulfill ride requests for one or more users 801 by dispatching suitable vehicles. The transportation management system 860 may receive any number of ride requests from any number of ride requestors 801. In particular embodiments, a ride request from a ride requestor 801 may include an identifier that identifies the ride requestor in the system 860. The transportation management system 860 may use the identifier to access and store the ride requestor's 801 information, in accordance with the requestor's 801 privacy settings. The ride requestor's 801 information may be stored in one or more data stores (e.g., a relational database system) associated with and accessible to the transportation management system 860. In particular embodiments, ride requestor information may include profile information about a particular ride requestor 801. In particular embodiments, the ride requestor 801 may be associated with one or more categories or types, through which the ride requestor 801 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 860 may classify a user 801 based on known information about the user 801 (e.g., using machine-learning classifiers), and use the classification to retrieve relevant aggregate information associated with that class. For example, the system 860 may classify a user 801 as a young adult and retrieve relevant aggregate information associated with young adults, such as the type of music generally preferred by young adults.

Transportation management system 860 may also store and access ride information. Ride information may include locations related to the ride, traffic data, route options, optimal pick-up or drop-off locations for the ride, or any other suitable information associated with a ride. As an example and not by way of limitation, when the transportation management system 860 receives a request to travel from San Francisco International Airport (SFO) to Palo Alto, Calif., the system 860 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 860. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 860. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 860 in particular embodiments may predict and provide ride suggestions in response to a ride request. In particular embodiments, the system 860 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 860 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 860 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 830 (which may belong to a ride requestor or provider), a transportation management system 860, vehicle system 840, or a third-party system 870 to process, transform, manage, retrieve, modify, add, or delete the information stored in the data store.

In particular embodiments, transportation management system 860 may include an authorization server (or any other suitable component(s)) that allows users 801 to opt-in to or opt-out of having their information and actions logged, recorded, or sensed by transportation management system 860 or shared with other systems (e.g., third-party systems 870). In particular embodiments, a user 801 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 801 of transportation management system 860 through blocking, data hashing, anonymization, or other suitable techniques as appropriate.

In particular embodiments, third-party system 870 may be a network-addressable computing system that may provide HD maps or host GPS maps, customer reviews, music or content, weather information, or any other suitable type of information. Third-party system 870 may generate, store, receive, and send relevant data, such as, for example, map data, customer review data from a customer review website, weather data, or any other suitable type of data. Third-party system 870 may be accessed by the other computing entities of the network environment either directly or via network 810. For example, user device 830 may access the third-party system 870 via network 810, or via transportation management system 860. In the latter case, if credentials are required to access the third-party system 870, the user 801 may provide such information to the transportation management system 860, which may serve as a proxy for accessing content from the third-party system 870.

In particular embodiments, user device 830 may be a mobile computing device such as a smartphone, tablet computer, or laptop computer. User device 830 may include one or more processors (e.g., CPU and/or GPU), memory, and storage. An operating system and applications may be installed on the user device 830, such as, e.g., a transportation application associated with the transportation management system 860, applications associated with third-party systems 870, and applications associated with the operating system. User device 830 may include functionality for determining its location, direction, or orientation, based on integrated sensors such as GPS, compass, gyroscope, or accelerometer. User device 830 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 830 may also include one or more cameras, scanners, touchscreens, microphones, speakers, and any other suitable input-output devices.

In particular embodiments, the vehicle 840 may be an autonomous vehicle and equipped with an array of sensors 844, a navigation system 846, and a ride-service computing device 848. In particular embodiments, a fleet of autonomous vehicles 840 may be managed by the transportation management system 860. The fleet of autonomous vehicles 840, in whole or in part, may be owned by the entity associated with the transportation management system 860, or they may be owned by a third-party entity relative to the transportation management system 860. In either case, the transportation management system 860 may control the operations of the autonomous vehicles 840, including, e.g., dispatching select vehicles 840 to fulfill ride requests, instructing the vehicles 840 to perform select operations (e.g., head to a service center or charging/fueling station, pull over, stop immediately, self-diagnose, lock/unlock compartments, change music station, change temperature, and any other suitable operations), and instructing the vehicles 840 to enter select operation modes (e.g., operate normally, drive at a reduced speed, drive under the command of human operators, and any other suitable operational modes).

In particular embodiments, the autonomous vehicles 840 may receive data from and transmit data to the transportation management system 860 and the third-party system 870. Example of received data may include, e.g., instructions, new software or software updates, maps, 3D models, trained or untrained machine-learning models, location information (e.g., location of the ride requestor, the autonomous vehicle 840 itself, other autonomous vehicles 840, and target destinations such as service centers), navigation information, traffic information, weather information, entertainment content (e.g., music, video, and news) ride requestor information, ride information, and any other suitable information. Examples of data transmitted from the autonomous vehicle 840 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 840, passengers may send/receive data to the transportation management system 860 and/or third-party system 870), and any other suitable data.

In particular embodiments, autonomous vehicles 840 may also communicate with each other as well as other traditional human-driven vehicles, including those managed and not managed by the transportation management system 860. For example, one vehicle 840 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 860 or third-party system 870).

In particular embodiments, an autonomous vehicle 840 may obtain and process sensor/telemetry data. Such data may be captured by any suitable sensors. For example, the vehicle 840 may have aa Light Detection and Ranging (LiDAR) sensor array of multiple LiDAR transceivers that are configured to rotate 360°, emitting pulsed laser light and measuring the reflected light from objects surrounding vehicle 840. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 840. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 840 may have optical cameras pointing in different directions. The cameras may be used for, e.g., recognizing roads, lane markings, street signs, traffic lights, police, other vehicles, and any other visible objects of interest. To enable the vehicle 840 to "see" at night, infrared cameras may be installed. In particular embodiments, the vehicle may be equipped with stereo vision for, e.g., spotting hazards such as pedestrians or tree branches on the road. As another example, the vehicle 840 may have radars for, e.g., detecting other vehicles and/or hazards afar. Furthermore, the vehicle 840 may have ultrasound equipment for, e.g., parking and obstacle detection. In addition to sensors enabling the vehicle 840 to detect, measure, and understand the external world around it, the vehicle 840 may further be equipped with sensors for detecting and self-diagnosing the vehicle's own state and condition. For example, the vehicle 840 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 840 may build a 3D model of its surrounding based on data from its LiDAR, radar, sonar, and cameras, along with a pre-generated map obtained from the transportation management system 860 or the third-party system 870. Although sensors 844 appear in a particular location on autonomous vehicle 840 in FIG. 8, sensors 844 may be located in any suitable location in or on autonomous vehicle 840. Example locations for sensors include the front and rear bumpers, the doors, the front windshield, on the side panel, or any other suitable location.

In particular embodiments, the autonomous vehicle 840 may be equipped with a processing unit (e.g., one or more CPUs and GPUs), memory, and storage. The vehicle 840 may thus be equipped to perform a variety of computational and processing tasks, including processing the sensor data, extracting useful information, and operating accordingly. For example, based on images captured by its cameras and a machine-vision model, the vehicle 840 may identify particular types of objects captured by the images, such as pedestrians, other vehicles, lanes, curbs, and any other objects of interest.

In particular embodiments, the autonomous vehicle 840 may have a navigation system 846 responsible for safely navigating the autonomous vehicle 840. In particular embodiments, the navigation system 846 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 846 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 846 may use its determinations to control the vehicle 840 to operate in prescribed manners and to guide the autonomous vehicle 840 to its destinations without colliding into other objects. Although the physical embodiment of the navigation system 846 (e.g., the processing unit) appears in a particular location on autonomous vehicle 840 in FIG. 8, navigation system 846 may be located in any suitable location in or on autonomous vehicle 840. Example locations for navigation system 846 include inside the cabin or passenger compartment of autonomous vehicle 840, near the engine/battery, near the front seats, rear seats, or in any other suitable location.

In particular embodiments, the autonomous vehicle 840 may be equipped with a ride-service computing device 848, which may be a tablet or any other suitable device installed by transportation management system 860 to allow the user to interact with the autonomous vehicle 840, transportation management system 860, other users 801, or third-party systems 870. In particular embodiments, installation of ride-service computing device 848 may be accomplished by placing the ride-service computing device 848 inside autonomous vehicle 840, and configuring it to communicate with the vehicle 840 via a wire or wireless connection (e.g., via Bluetooth). Although FIG. 8 illustrates a single ride-service computing device 848 at a particular location in autonomous vehicle 840, autonomous vehicle 840 may include several ride-service computing devices 848 in several different locations within the vehicle. As an example and not by way of limitation, autonomous vehicle 840 may include four ride-service computing devices 848 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 848 may be detachable from any component of autonomous vehicle 840. This may allow users to handle ride-service computing device 848 in a manner consistent with other tablet computing devices. As an example and not by way of limitation, a user may move ride-service computing device 848 to any location in the cabin or passenger compartment of autonomous vehicle 840, may hold ride-service computing device 848, or handle ride-service computing device 848 in any other suitable manner. Although this disclosure describes providing a particular computing device in a particular manner, this disclosure contemplates providing any suitable computing device in any suitable manner.

Figure 9:
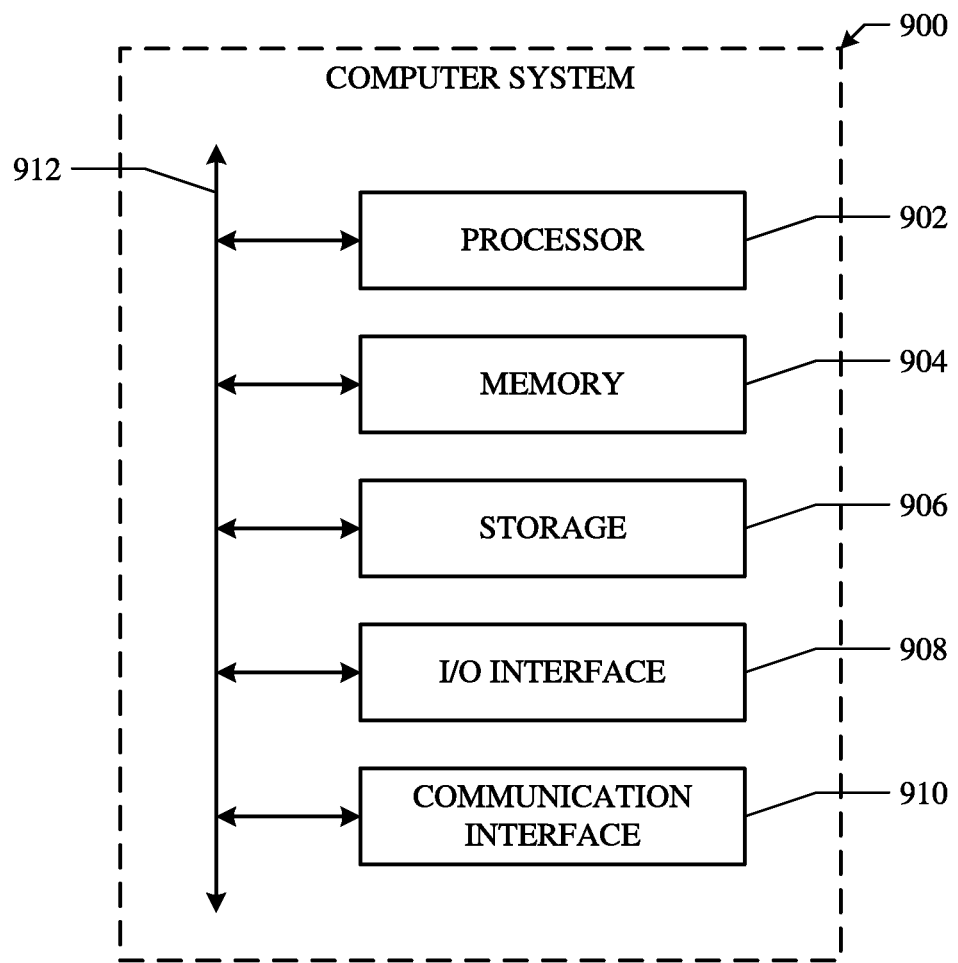
FIG. 9 illustrates an example of a computing system.

FIG. 9 illustrates an example computer system 900. In particular embodiments, one or more computer systems 900 perform one or more steps of one or more methods described or illustrated herein. In particular embodiments, one or more computer systems 900 provide the functionalities described or illustrated herein. In particular embodiments, software running on one or more computer systems 900 performs one or more steps of one or more methods described or illustrated herein or provides the functionalities described or illustrated herein. Particular embodiments include one or more portions of one or more computer systems 900. Herein, a reference to a computer system may encompass a computing device, and vice versa, where appropriate. Moreover, a reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 that are to be operated on by computer instructions; the results of previous instructions executed by processor 902 that are accessible to subsequent instructions or for writing to memory 904 or storage 906; or any other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs), be a multi-core processor, or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described in further detail below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   receiving, by a computing device, a plurality of sensor data from a plurality of vehicles within a geographic area that are associated with each other, wherein the plurality of sensor data are associated with different points-of-view of the geographic area;
   processing, by the computing device, a combination of the plurality of sensor data from the plurality of vehicles to generate an assessment of the geographic area surrounding the plurality of vehicles based on the different points-of-view of the geographic area;
   detecting, by the computing device, an occurrence of an event based on the assessment of the geographic area;
   identifying, by the computing device, a particular vehicle in the plurality of vehicles that is predicted to be affected by the occurrence of the event; and
   sending, by the computing device, one or more instructions associated with the occurrence of the event to the particular vehicle.

2. The method of claim 1, further comprising, prior to receiving the plurality of sensor data:
   requesting, by the computing device, the plurality of sensor data from the plurality of vehicles.

3. The method of claim 1, wherein the plurality of sensor data are automatically sent from each of the plurality of vehicles (1) when the vehicle determines that an event has occurred or (2) periodically based on a predetermined time period.

4. The method of claim 1, wherein processing the combination of the plurality of sensor data from the plurality of vehicles comprises:
   associating each of the plurality of sensor data with one or more time stamps;
   synchronizing the plurality of sensor data based on the time stamps;
   generating the different points-of-view of the geographic area based on the synchronized plurality of sensor data; and
   assessing the different points-of-view of the geographic area to determine the occurrence of the event.

5. The method of claim 1, wherein identifying the particular vehicle in the plurality of vehicles that is predicted to be affected by the occurrence of the event comprises:
   determining one or more of the plurality of vehicles that are affected by, or predicted to be affected by, the occurrence of the event;
   prioritizing the determined one or more vehicles based on the occurrence of the event; and
   selecting a vehicle of the determined one or more vehicles with a highest priority as the particular vehicle.

6. The method of claim 5, wherein prioritizing the determined one or more vehicles is further based on at least one of:
- a degree of route alteration associated with a vehicle of the determined one or more vehicles due to the occurrence of the event,
- a distance from a vehicle of the determined one or more vehicles to a location of the event,
- a current route of a vehicle of the determined one or more vehicles, or
- a distance from a vehicle of the determined one or more vehicles to a location associated with the computing device.

7. The method of claim 1, wherein detecting the occurrence of the event based on the assessment of the geographic area comprises:
- determining one or more relevant routes associated with the plurality of vehicles; and
- analyzing the assessment of the geographic area based on the one or more relevant routes associated with the plurality of vehicles.

8. The method of claim 1, wherein the one or more instructions sent to the particular vehicle instruct the particular vehicle to make one or more route alterations.

9. The method of claim 1, wherein the one or more instructions sent to the particular vehicle instruct the particular vehicle to process and assess additional sensor data from one or more other vehicles.

10. The method of claim 1, further comprising:
- assessing, by the computing device, a state of one or more sensors associated with each of the plurality of vehicles based on a comparison of the plurality of sensor data from the plurality of vehicles; and
- determining, by the computing device, that one or more of the sensors associated with the plurality of vehicles require calibration based on the comparison.

11. The method of claim 1, wherein the computing device resides in, is coupled to, or is located within a vicinity of one of the plurality of vehicles, an aerial vehicle, or a base station.

12. The method of claim 1, wherein the event is a predetermined event, and wherein the one or more instructions associated with the event are predetermined instructions.

13. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
- receiving a plurality of sensor data from a plurality of vehicles within a geographic area that are associated with each other, wherein the plurality of sensor data are associated with different points-of-view of the geographic area;
- processing a combination of the plurality of sensor data from the plurality of vehicles to generate an assessment of the geographic area surrounding the plurality of vehicles based on the different points-of-view of the geographic area;
- detecting an occurrence of an event based on the assessment of the geographic area;
- identifying a particular vehicle in the plurality of vehicles that is predicted to be affected by the occurrence of the event; and
- sending one or more instructions associated with the occurrence of the event to the particular vehicle.

14. The system of claim 13, wherein processing the combination of the plurality of sensor data from the plurality of vehicles comprises:
- associating each of the plurality of sensor data with one or more time stamps;
- synchronizing the plurality of sensor data based on the time stamps;
- generating the different points-of-view of the geographic area based on the synchronized plurality of sensor data; and
- assessing the different points-of-view of the geographic area to determine the occurrence of the event.

15. The system of claim 13, wherein identifying the particular vehicle in the plurality of vehicles that is predicted to be affected by the occurrence of the event comprises:
- determining one or more of the plurality of vehicles that are affected by, or predicted to be affected by, the occurrence of the event;
- prioritizing the determined one or more vehicles based on at least one of:
  - a degree of route alteration associated with a vehicle of the determined one or more vehicles due to the occurrence of the event,
  - a distance from a vehicle of the determined one or more vehicles to a location of the event,
  - a current route of a vehicle of the determined one or more vehicles, or
  - a distance from a vehicle of the determined one or more vehicles to a location associated with the computing device; and
- selecting a vehicle of the determined one or more vehicles with a highest priority as the particular vehicle.

16. The system of claim 13, wherein detecting the occurrence of the event based on the assessment of the geographic area comprises:
- determining one or more relevant routes associated with the plurality of vehicles; and
- analyzing the assessment of the geographic area based on the one or more relevant routes associated with the plurality of vehicles.

17. One or more computer-readable non-transitory storage media including instructions that, when executed by one or more processors, are configured to cause the one or more processors to perform operations comprising:
- receiving a plurality of sensor data from a plurality of vehicles within a geographic area that are associated with each other, wherein the plurality of sensor data are associated with different points-of-view of the geographic area;
- processing a combination of the plurality of sensor data from the plurality of vehicles to generate an assessment of the geographic area surrounding the plurality of vehicles based on the different points-of-view of the geographic area;
- detecting an occurrence of an event based on the assessment of the geographic area;
- identifying a particular vehicle in the plurality of vehicles that is predicted to be affected by the occurrence of the event; and
- sending one or more instructions associated with the occurrence of the event to the particular vehicle.

18. The one or more computer-readable non-transitory storage claim 17, wherein processing the combination of the plurality of sensor data from the plurality of vehicles comprises:

associating each of the plurality of sensor data with one or more time stamps;

synchronizing the plurality of sensor data based on the time stamps;

generating the different points-of-view of the geographic area based on the synchronized plurality of sensor data; and assessing the different points-of-view of the geographic area to determine the occurrence of the event.

19. The one or more computer-readable non-transitory storage claim 17, wherein identifying the particular vehicle in the plurality of vehicles that is predicted to be affected by the occurrence of the event comprises:

determining one or more of the plurality of vehicles that are affected by, or predicted to be affected by, the occurrence of the event;

prioritizing the determined one or more vehicles based on at least one of:

a degree of route alteration associated with a vehicle of the determined one or more vehicles due to the occurrence of the event, a distance from a vehicle of the determined one or more vehicles to a location of the event, a current route of a vehicle of the determined one or more vehicles, or a distance from a vehicle of the determined one or more vehicles to a location associated with the computing device; and selecting a vehicle of the determined one or more vehicles with a highest priority as the particular vehicle.

20. The one or more computer-readable non-transitory storage media of claim 17, wherein detecting the occurrence of the event based on the assessment of the geographic area comprises:

determining one or more relevant routes associated with the plurality of vehicles; and analyzing the assessment of the geographic area based on the one or more relevant routes associated with the plurality of vehicles.

* * * * *